F. B. ENDERS.
METHOD OF FORMING GRAIN SHOCKS.
APPLICATION FILED JUNE 24, 1920.

1,391,248.

Patented Sept. 20, 1921.

Witness

Inventor,
F. B. Enders
By C. A. Snow & Co.
Attorneys.

UNITED STATES PATENT OFFICE.

FREDERICK B. ENDERS, OF DE QUINCY, LOUISIANA.

METHOD OF FORMING GRAIN-SHOCKS.

1,391,248.     Specification of Letters Patent.     Patented Sept. 20, 1921.

Application filed June 24, 1920. Serial No. 391,372.

*To all whom it may concern:*

Be it known that I, FREDERICK B. ENDERS, a citizen of the United States, residing at De Quincy, in the parish of Calcasieu and State of Louisiana, have invented a new and useful Method of Forming Grain-Shocks, of which the following is a specification.

This invention has for its object a new and improved method of forming shocks of grain in a field whereby but a small portion of the grain is exposed to the weather.

The shocks being so formed that in the event of a rain fall ample ventilation is provided so that the sheaves may readily dry, thus eliminating the possibility of the grain remaining damp and sprouting as often happens in the present method of shocking grain.

With these and other objects in view as will appear as the description proceeds, the invention resides in the method hereinafter described and particularly pointed out in the appended claims, it being understood that changes may be made falling within the scope of what is claimed without departing from the spirit of the invention.

Figure 1:
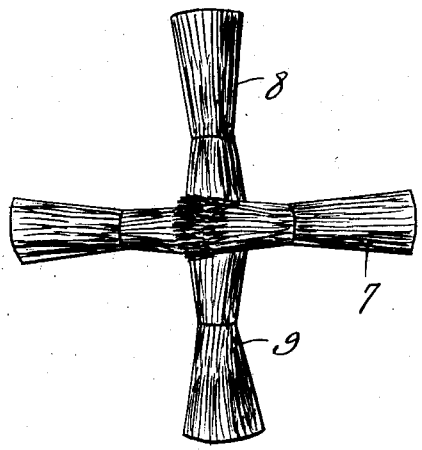
Figure 1 is a plan view of a shock formed in accordance with the present method.
Figure 2:
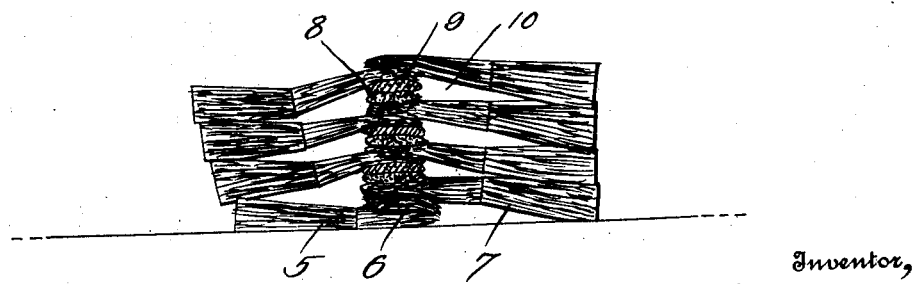
Fig. 2 is a view in side elevation parts being in section.

Referring to the drawing wherein is shown my improved method of forming shocks, the numeral 5 designates the base sheaf, the same having the head or grain end thereof bent upon itself as indicated at 6. This sheaf is placed flat on the ground and a second sheaf 7 is placed with its head portion on the bent back head of the sheaf 5, the butt of the sheaf 7 extending preferably but not necessarily, away from and in right line with the length of the sheaf 5, other sheaves 8 and 9 are placed at approximately right angles to the sheaves 5 and 7. Other sheaves are placed on the cross thus formed, building the shock of any convenient size.

It will be observed that a shock formed as above outlined provides air spaces as indicated at 10 between the sheaves so that air may circulate between the sheaves. It will also be seen that but one sheaf rests flat on the ground and that the grain portion of this particular sheaf is not in contact with the ground, also the bundles incline downwardly and outwardly from the heads or grain portion of the bundle and that the severed ends of the stalks do not rest on the ground but are elevated so that air may circulate through the stalks and dry the same.

Having thus described the invention what is claimed is:—

The hereindescribed method of forming a shock which consists of placing a bottom sheaf flat on the ground with its head portion bent upwardly and backwardly upon the sheaf and then placing additional sheaves with their heads superimposed on the head of the bottom sheaf.

In testimony that I claim the foregoing as my own, I have hereto affixed my signature in the presence of two witnesses.

FRED. B. ENDERS.

Witnesses:
    F. S. CARROLL,
    C. E. ENDERS.